April 16, 1940.                J. HIRAK                 2,197,305
                            ROTARY WEED HOER
                           Filed May 1, 1939              2 Sheets-Sheet 1

INVENTOR
Joseph Hirak
By Ralph Burch
Attorney

April 16, 1940.  J. HIRAK  2,197,305

ROTARY WEED HOER

Filed May 1, 1939  2 Sheets-Sheet 2

INVENTOR
Joseph Hirak
By Ralph Burch
Attorney

Patented Apr. 16, 1940

2,197,305

UNITED STATES PATENT OFFICE 2,197,305

ROTARY WEED HOER

Joseph Hirak, Oakburn, Manitoba, Canada

Application May 1, 1939, Serial No. 271,180
In Canada November 29, 1938

4 Claims. (Cl. 97—40)

This invention relates to new and useful improvements in a rotary weed hoer. Its primary object is to provide a mechanized farm implement for the removal of weeds from the ground which includes rotating blades arranged to engage the earth at or below the surface in a manner to cut or pull the weed out by the roots and leave them on the surface to be killed by the sun or wind.

A further object of the invention is to provide a farm implement having a rotary blade mechanism which is interchangeable with other rotary mechanism more suitable for various types of weed growth for example, a rotary mechanism having bars equipped with projecting teeth which is more adaptable to the "runner" type of weed root such as couch grass and the like.

Other objects include mechanism to raise and lower the rotary element and to provide clutch means whereby the same may be made inoperative when moving from place to place.

With these and other objects in view that may appear while the description proceeds the invention consists in the novel construction and arrangement of parts as hereinafter more specifically set forth, claimed and shown in the accompanying drawings and in which:

Figure 1:
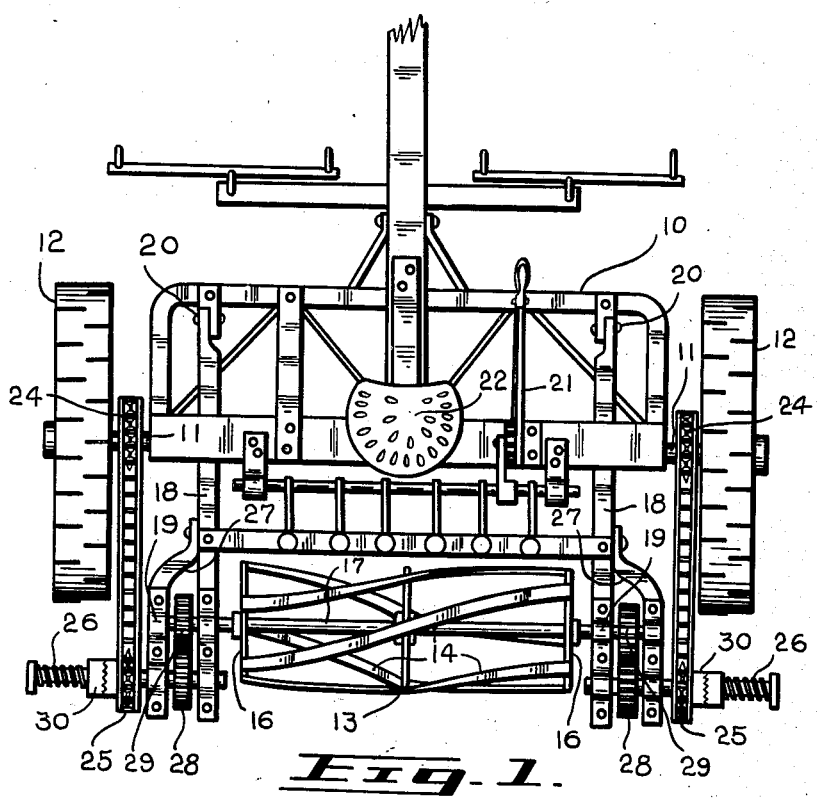
Fig. 1 is a plan view of my rotary weed hoer.

Referring more in detail to the drawings in which similar reference characters designate corresponding parts throughout the several views it will be seen the invention consists of a frame 10 mounted on axles 11 which also form drive shafts for the operating mechanism. Drive wheels 12 are fixed on the said axles by means of which power is obtained for driving the mechanism as the device is pulled over the ground.

Figure 2:
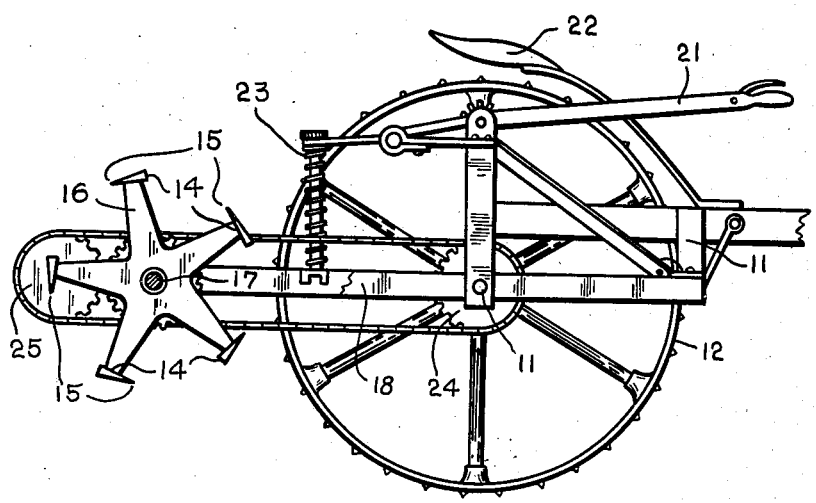
Fig. 2 is a side elevation of the same with the rotary element in the raised position.
Figure 3:
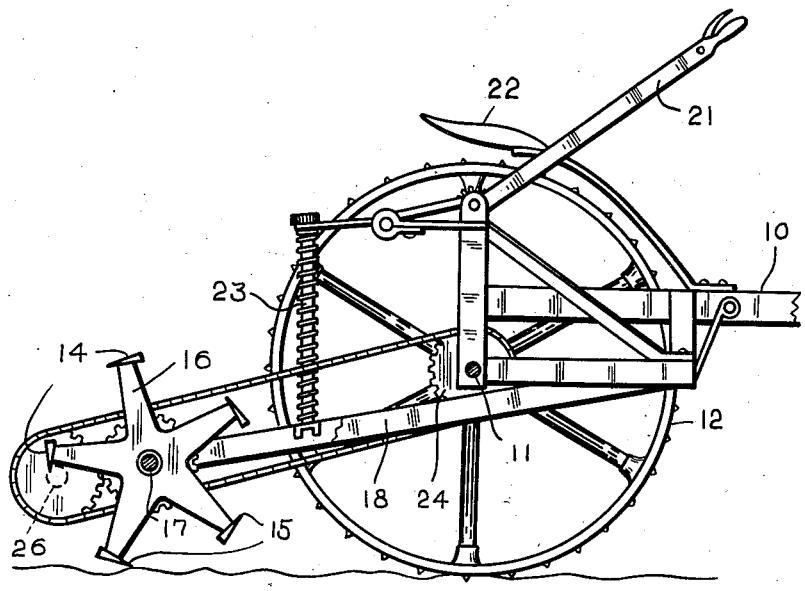
Fig. 3 is a side elevation with the rotary elements in the working position.

The rotary element 13 as shown in Figs. 1 to 3 inclusive, consists of a plurality of blades 14 which may be curved as shown and are provided with a sharpened edge 15 which is to the front as the blade encounters the ground. The blades are mounted on headers 16 which in turn are mounted on the axle 17. The axle is rotatably mounted in the sub-frame 18 in bearings 19, the upper halves of which are removable to permit complete removal of the rotary element to be replaced by another rotary element for other purposes.

The sub-frame 18 is pivoted at 20 to the main frame 10 to permit vertical movement to the working element. The movement is controlled by a lever 21 adjacent the operator's seat 22. The lever actuates connecting arms 23, which in turn move the main side bars of the sub-frame.

The drive for the rotary element is conveyed by a drive chain from sprockets 24 on the axles 11 to corresponding sprockets 25 on a clutch shaft 26 mounted in bearings on the sub-frame 18 and a support arm 27. Gears 28 and 29 transfer the rotary motion from the shaft 26 to the axle 17. Clutches 30 are provided on the clutch shafts to disconnect the same from the sprockets 25 which are then free to rotate on the shafts without driving the rotary element.

Figure 4:
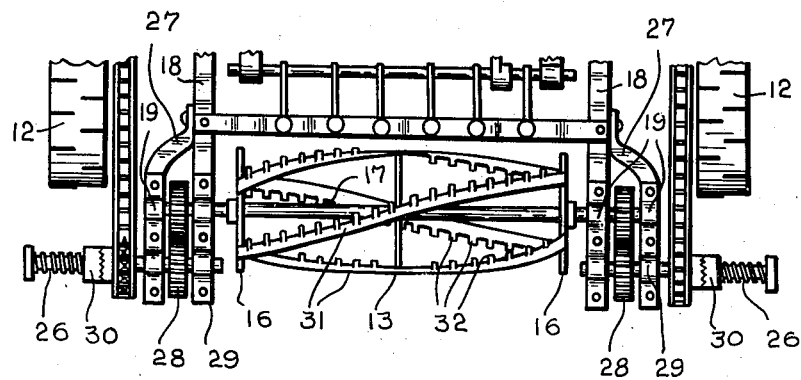
Fig. 4 is a partial plan view showing an interchangeable rotary element in position in the machine.

In Fig. 4, a rotary element 13 is shown having blades or bars 31 on which are mounted a plurality of teeth 32. These are designed particularly for tearing couch grass roots from the earth as the device rotates.

From the foregoing it will be seen the rotary element may be raised for traveling from one field of operation to another. When in action the rotary element may be lowered to any desired depth in the soil in order to disturb the same and remove the weed roots which are deposited on top of the soil and left for the sun and air to destroy.

It is believed that the construction and advantages of the structure shown may be apparent from the foregoing paragraphs taken in conjunction with the accompanying drawings without further detailed description.

While the preferred embodiment of the invention has been disclosed it is understood that minor changes in the details of construction, combination and arrangement of co-operating parts may be resorted to within the scope of what is claimed without departing from the spirit of the invention.

I claim:

1. In a rotary weed hoer as described, comprising a main frame and pair of drive wheels independently mounted on drive shafts, a sub-frame pivoted to the main frame for vertical movement to the rear, a rotary element consisting of a plurality of sharpened blades mounted on headers secured on a central axle, said axle being rotatably mounted in said sub-frame and having drive gears mounted adjacent the outer ends thereof, corresponding gears mounted on clutch shafts, said clutch shafts being rotatably mounted in said sub-frame in parallel spaced apart relation to the axle of said rotary element, spring actuated clutches mounted thereon and means connecting the same to the drive shafts for conveying rotary motion from the wheels to the rotary element.

2. In a rotary weed hoer as described, comprising a main frame and a pair of drive wheels independently mounted on drive shafts, a sub-frame pivoted to the main frame for vertical movement to the rear, a rotary element consisting of a plurality of sharpened blades mounted on headers secured on a central axle, said axle being rotatably mounted in said sub-frame and having drive gears mounted adjacent the outer ends thereof, corresponding gears mounted on clutch shafts, said clutch shafts being rotatably mounted in said sub-frame in parallel spaced apart relation to the axle of said rotary element, spring actuated clutches, mounted thereon, sprockets mounted on said clutches, corresponding sprockets mounted on the drive shafts and chains connecting the same for transferring rotary motion from the drive wheels to the rotary element.

3. In a rotary weed hoer as described, comprising a main frame and a pair of drive wheels independently mounted on drive shafts, a sub-frame pivoted to the main frame for vertical movement to the rear, a rotary element consisting of a plurality of sharpened blades mounted on headers secured on a central axle, said axle being rotatably mounted in said sub-frame and having drive gears mounted adjacent the outer ends thereof, corresponding gears mounted on clutch shafts, said clutch shafts being rotatably mounted in said sub-frame in parallel spaced apart relation to the axle of said rotary element, spring actuated clutches mounted thereon, sprockets mounted in the drive shafts and chains connecting the same for transferring rotary motion from the drive wheels to the rotary element, said rotary element being detachable and interchangeable.

4. In a rotary weed hoer as described, comprising a main frame and a pair of drive wheels independently mounted on drive shafts, a sub-frame pivoted to the main frame for vertical movement to the rear, a rotary element consisting of a plurality of sharpened blades mounted on headers secured on a central axle, said axle being rotatably mounted in said sub-frame and having drive gears mounted adjacent the outer ends thereof, corresponding gears mounted on clutch shafts, said clutch shafts being rotatably mounted in said sub-frame in parallel spaced apart relation to the axle of said rotary element, spring actuated clutches mounted thereon, sprockets mounted on said clutches, corresponding sprockets mounted on the drive shafts and chains connecting the same for transferring rotary motion from the drive wheels to the rotary element and means raising or lowering said sub-frame to adjust the position of the rotary element with respect to the surface of the soil, substantially as set forth.

JOSEPH HIRAK.